(12) United States Patent
Deng et al.

(10) Patent No.: US 9,045,711 B2
(45) Date of Patent: Jun. 2, 2015

(54) PERFLUORINATED POLYETHERS (PFPE) AS MAGNETIC LUBRICANTS

(75) Inventors: Hong Deng, San Jose, CA (US); Xing-Cai Guo, Tracy, CA (US); Vedantham Raman, Morgan Hill, CA (US); Robert Waltman, Gilroy, CA (US); Yu-Chen Wu, San Jose, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 437 days.

(21) Appl. No.: 13/328,869

(22) Filed: Dec. 16, 2011

(65) Prior Publication Data

US 2013/0157082 A1 Jun. 20, 2013

(51) Int. Cl.
*G11B 5/66* (2006.01)
*C10M 131/10* (2006.01)
*G11B 5/00* (2006.01)

(52) U.S. Cl.
CPC .............. *C10M 131/10* (2013.01); *G11B 5/00* (2013.01)

(58) Field of Classification Search
CPC .............. C10M 2213/06; C10M 2213/0606; C10M 2213/04; C10M 2213/043; C10M 107/38
USPC .......................................... 508/582; 428/835.8
See application file for complete search history.

(56) References Cited

U.S. PATENT DOCUMENTS

| | | | |
|---|---|---|---|
| 5,663,127 A * | 9/1997 | Flynn et al. .................... | 508/250 |
| 6,663,971 B1 | 12/2003 | Falcone | |
| 7,323,260 B2 | 1/2008 | Kobayashi et al. | |
| 7,361,421 B2 | 4/2008 | Ohchi | |
| 7,510,999 B2 | 3/2009 | Deng et al. | |
| 7,682,712 B2 | 3/2010 | Liu et al. | |
| 7,683,012 B2 | 3/2010 | Burns et al. | |
| 7,943,558 B2 | 5/2011 | Burns et al. | |
| 7,998,912 B2 | 8/2011 | Chen et al. | |
| 2003/0073588 A1* | 4/2003 | Howell et al. .................. | 508/182 |
| 2005/0027052 A1* | 2/2005 | Sarkar et al. ................... | 524/341 |
| 2007/0116990 A1* | 5/2007 | Shirakawa et al. ......... | 428/835.8 |
| 2007/0225183 A1* | 9/2007 | Sasa et al. ...................... | 508/582 |

OTHER PUBLICATIONS

Lei et al., "Thermal stability of Fomblin Z and Zdol thin films on amorphous hydrogenated carbon," Tribology Letters, vol. 11, No. 1, Mar. 2001, pp. 1-5.*

* cited by examiner

*Primary Examiner* — Holly Rickman

(57) ABSTRACT

A surface agent includes two end portions and a middle portion disposed between the end portions. The end portions include an anchor group or a truncation group. The anchor group includes at least one surface active functional group. The midsection includes at least one perfluoroalkyl-branched perfluorinated ether unit.

15 Claims, 5 Drawing Sheets

PERFLUORINATED POLYETHERS (PFPE) AS MAGNETIC LUBRICANTS

BACKGROUND

1. Field of Disclosure

The invention is generally related to lubricants and, in particular, to derivatives of perfluoropolyether lubricants for magnetic media disks in hard disk drive applications.

2. Description of Related Art

Lubricants, such as boundary lubricants, are used in many types of mechanical devices including disk drives and microelectronic mechanical systems. Such devices typically include a moving part that is lubricated to prevent wear. The moving part moves relative to other parts of the device. Boundary lubricants form a lubricating film when functional groups of the lubricant attach to the surface being lubricated. Boundary lubricants, among other advantages, limit solid-to-solid contact.

In an effort to increase disk drive capacity, industry is seeking to reduce flying height of the slider above the disk. However, lower flying height can induce severe slider/lubricant interactions. For example, slider/lubricant interactions can create moguls, ripples, and depletion in the lubricant on the disk surface. In addition, lubricant can gather on the slider, forming drops that fall onto the disk surface, leaving thick regions. As a result, the thicker regions, moguls, and ripples can cause errors in reading the disk, whereas regions without lubricant may permit surface scratching in the disk or damage to the head of the disk drive. For at least these reasons, lubricants are desired that eliminate or significantly reduce such detriments.

SUMMARY

Derivatives of a perfluoropolyether lubricants and systems incorporating same are disclosed. The lubricant includes segments of branched perfluoropolyalkyl ether. The lubricant further includes an anchor group having at least one surface active end group. In a particular embodiment, the surface agent includes at least one trifluoromethyl perfluoropolyalkyl ether segment including perfluorobutyl ether units. In another embodiment, the surface agent and at least one trifluoromethyl perfluoropolyalkyl ether segment including perfluoroethyl ether units. The surface agent may be placed on a media disk comprising a substrate and a magnetic recording layer, and a carbon overcoat layer, with the lubricant on the overcoat layer.

In other embodiments, a hard disk drive comprises an enclosure, a disk rotatably mounted to the enclosure and having a substrate with a magnetic recording layer, and an actuator movably mounted to the enclosure and having a head for reading data from the disk, with the surface agent on the disk. The surface agent also may be used on other mechanical devices comprising a movable part subject to wear, with the movable part being lubricated with the surface agent including at least one perfluoroalkyl-branched perfluoropolyalkyl ether segment including perfluorobutyl ether units and at least one perfluoropolyalkyl ether segment including perfluoroethyl ether units.

In another embodiment, a storage device includes a magnetic media. The storage device further includes a lubricant disposed on the magnetic media. The lubricant can include a compound selected from the group comprising the formula $R_a$—$R_b$—$R_c$. The moiety $R_b$ can include:

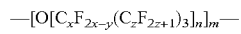

Variable x can be an integer in the range between 1 and 8, y can be an integer between 1 and 2x, z can be an integer between 1 and 3, n can be an integer between 1 and 6, and m can be an integer between 1 and 50. At least one of $R_a$ and $R_c$ can include an anchor group or a truncation group.

In another embodiment, a coating solution includes a solvent and a surface agent. The surface agent can include a compound selected from the group comprising the formula $R_a$—$R_b$—$R_c$. The moiety $R_b$ can include:

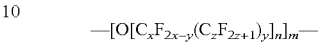

Variable x can be an integer in the range between 1 and 8, y can be an integer between 1 and 2x, z can be an integer between 1 and 3, n can be an integer between 1 and 6, and m can be an integer between 1 and 50. At least one of $R_a$ and $R_c$ can include an anchor group or a truncation group.

In yet one further embodiment, a method of manufacturing a storage device includes a magnetic media. The method further includes depositing at least one lubricant onto the magnetic media. The lubricant can include a compound selected from the group comprising the formula $R_a$—$R_b$—$R_c$. The moiety $R_b$ can include:

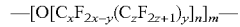

Variable x can be an integer in the range between 1 and 8, y can be an integer between 1 and 2x, z can be an integer between 1 and 3, n can be an integer between 1 and 6, and m can be an integer between 1 and 50. At least one of $R_a$ and $R_c$ can include an anchor group or a truncation group.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the embodiments are attained and can be understood in more detail, a more particular description of the embodiments briefly summarized above may be had by reference to the appended drawings. However, the drawings illustrate only some embodiments and therefore are not to be considered limiting of the scope of the invention which may admit to other equally effective embodiments.

DETAILED DESCRIPTION

Figure 1:
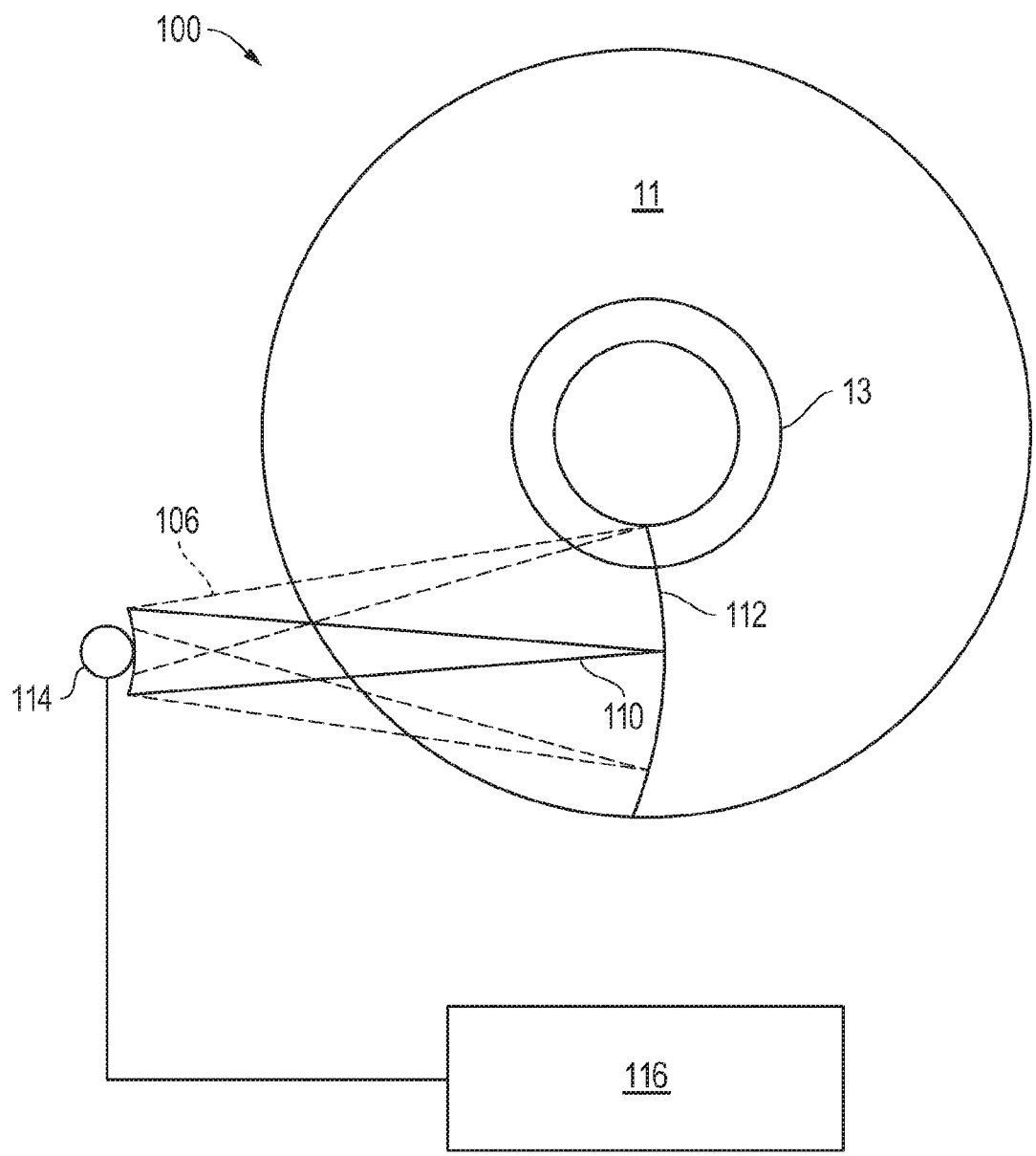
FIG. 1 includes a schematic diagram of one embodiment of a disk drive.

In an exemplary embodiment, a lubricant includes segments of perfluoroalkyl-branched perfluoropolyalkyl ether and segments having surface active functional groups, i.e. anchor groups and/or truncation groups. In a particular example, the lubricant includes at least one perfluoropolyalkyl ether segment including perfluorobutylene-1,4-ether having at least one side branch including a perfluoroalkyl group, such as trifluoromethyl, pentafluoroethyl, heptafluoro-n-propyl, heptafluoro-1-propyl, etc., at least one surface active group or anchor group or at least one truncation group.

The anchor group can be any surface active group. The anchor group includes a polar group. The polar group has an affinity to bind to the surface of the magnetic media. In one embodiment, the anchor group can include a hydroxyl group, an ether group, an amino group, an alkylamino group, a diakylamino group, a hydroxyalkylamino group, a di-(hydroxyalkyl)-amino group, a hydroxyalkyl-alkyl-amino group, or a combination thereof.

The truncation group can be any group having non-polar group or a group with reduced polarity. In one embodiment, the truncation group includes a fluorinated group; a perfluorinated alkyl, such as trifluoromethyl, pentafluoroethyl, heptafluoro-n-propyl, heptafluoro-i-propyl, etc.; a perfluorinated alkyloxy group, a perfluorinated alkyl amino group, a perfluorinated diaklyl amino group, or a combination thereof.

When the lubricant is disposed on a surface, the surface active functional moiety of the anchor group can bond to the surface and the fluoroalkylether and perfluoropolyalkyl ether segments form a low surface energy region on the surface. In a particular embodiment, the surface can be part of a magnetic storage device.

Low surface energy can be modified by increasing the carbon-to-oxygen ratio in the perfluoropolyalky ether segments. In one embodiment the ratio can be increased by linear extension of the perfluorinated alkylene segments between two ether oxygen. In one other embodiment, the carbon oxygen ratio can be increased by grafting perfluorinated alkyl groups to the back chain of the perfluoropolyalkyl ethers. Substituting one of the fluorine atoms of the perfluoropolyalkyl ethers with perfluorinated alkyl groups improves the low surface energy property of the magnetic media.

In an exemplary method, a storage device is formed by dispensing magnetic media having a magnetic surface and applying a surface agent to the magnetic surface. The surface agent may be applied by dip coating, spray coating, spin coating, a vapor deposition technique, or any combination thereof.

As used herein, the terms "portion," "segment," or "section" refer to extents along a backbone or primary chain length of a molecule, typically formed of a chain of carbon and oxygen atoms. Functional groups, such as polar functional groups may extend from carbons bound within the backbone or primary chain of the surface agent molecule.

In an embodiment, a storage device includes a magnetic media and a lubricant. The lubricant can be disposed on the magnetic media. The lubricant can include compounds having the formula $R_a$—$R_b$—$R_c$.

Central section $R_b$ can include:

$$[O[C_xF_{2x-y}(C_zF_{2z+1})_y]_n]_m—$$

Variable x can be an integer in the range between 1 and 8. Variable y can be an integer between 1 and 2x. Variable z can be an integer between 1 and 3. Variable n can be an integer between 1 and 6. Variable m can be an integer between 1 and 50. Left hand end unit $R_a$ can include an anchor group or a truncation group. Right hand end unit $R_c$ can include an anchor group or a truncation group.

In an embodiment, $R_b$ can include

—[O—$CF_2$—$CF(CF_3)$—$CF_2$—$CF(CF_3)]_m$— or

—[O—$CF_2$—$CF(CF_3)]_m$—,

Variable m can be an integer between 1 and 50, such as m can be an integer between 1 and 25.

In one embodiment, the poly ether section $R_b$ can include internal fluorobutyl units having perfluorinated alkyl side groups. In another embodiment, the poly ether section $R_b$ can include internal fluoroethyl units having perfluorinated alkyl side groups. In yet one further embodiment, the $R_b$-moiety can be flanked with an unbranched perfluorinated alkyl ether unit. In one more specific embodiment, the lubricant can have the formula:

$$R_a—CH_2—CF_2[O—[C_xF_{2x-y}(C_zF_{2z+1})_y]_n]_m—[O—CF_2]_u—O—CF_2CH_2—R_c$$

Variables x, y, z, n, and m can be integers as described above. Variable u can be an integer between 0 and 6. $R_a$ and $R_c$ can be optionally an anchor group, a truncation group, or both.

In one further embodiment, the anchor group can include an atom or a group, such as —H, —OH, —$NH_2$, —$OR_z$, $NR_{z1}R_{z2}$, —$(CF_2)_s$—$(CH_2)_t$—OH, —$(CF_2)_s$—$(CH_2)_t$—$OR_z$, —$(CF_2)_s$—$(CH_2)_t$—$NH_2$, —$(CF_2)_s$—$(CH_2)_t$—$NHR_z$, or —$(CF_2)_s$—$(CH_2)_t$—$NR_{z1}R_{z2}$. In these moieties, variable s can be an integer between 0 and 3. Variable t can be an integer between 1 and 4. Groups $R_z$, $R_{z1}$, and $R_{z2}$ can independently represent hydrogen, an aliphatic alkyl group, a perfluorinated alkyl group, or a group comprising the formula:

$$—C_iH_{2i-j}(C_kH_{2k+1})_j—OH.$$

In this formula, variable i can represent an integer between 1 and 4. Variable j can represent an integer between 0 and 21. Variable k can represent an integer between 1 and 4.

In one further embodiment, the truncation group can include an atom or a group, such as —F, —$CF_3$, —$C_2F_5$, —$C_3F_7$, —$OR_v$, $NR_{v1}R_{v2}$, —$(CF_2)_s$—$(CH_2)_t$—$OR_v$, —$(CF_2)_s$—$(CH_2)_t$—$NFIR_v$, or —$(CF_2)_s$—$(CH_2)_t$—$NR_{v1}R_{v2}$. In these moieties, variable s can be an integer between 0 and 3. Variable t can be an integer between 1 and 4. Groups $R_v$, $R_{v1}$, and $R_{v2}$ can independently represent hydrogen, an aliphatic alkyl group, a perfluorinated alkyl group, or a group comprising the formula:

$$—C_pF_{2p-q}(C_rF_{2r+1})_q—F.$$

In this formula, variable p can represent an integer between 1 and 4. Variable q can represent an integer between 0 and 2p. Variable r can represent an integer between 1 and 4.

In yet one further embodiment, the lubricant $R_a$—$R_b$—$R_c$ can have the formula:

$$CF_3—CH_2—CF_2—[O—[C_xF_{2x-y}(C_zF_{2z+1})_y]_n]_m—[O—CF_2]_u—O—CF_2CH_2—OH \text{ or}$$

$$HO—CH_2—CF_2—[O—[C_xF_{2x-y}(C_zF_{2z+1})_y]_n]_m—[O—CF_2]_u—O—CF_2CH_2—CF_3$$

Variables x, y, z, n, and m can represent integers as described above.

In another embodiment, the lubricant $R_a$—$R_b$—$R_c$ can have the formula:

$$HO—CH_2—CF(CF_3)—[O—CF_2—CF(CF_3)—CF_2—CF(CF_3)]_m—F \text{ or}$$

$$HO—CH_2—CF(CF_3)—[O—CF_2—CF(CF_3)]_m—F.$$

Variable m can be an integer between 1 and 50, such as m can be an integer between 1 and 25.

In one further embodiment, the storage device includes at least one lubricant that has a molecular weight of at least about 1000 amu, such as at least about 1500 amu, at least about 2000 amu, or even at least about 3000 amu.

In yet another embodiment, the storage device includes at least one lubricant that has a molecular weight of not greater than about 8000 amu, such as not greater than about 7000 amu, not greater than about 6000 amu, or even not greater than about 5500 amu.

In one embodiment, the lubricant forms a layer with a thickness of at least about 0.1 Å, such as at least about 0.5 Å, at least about 1 Å, at least about 2 Å, at least about 4 Å, or even at least about 8 Å.

In yet another embodiment, the lubricant forms a layer with a thickness of not greater than about 30 Å, such as not greater than about 20 Å, not greater than about 15 Å, or even not greater than about 10 Å.

In another embodiment, the lubricant exhibits desirable properties such as Clearance Index. The "Clearance Index" is the difference in measured slider disk clearance relative to ZTMD coated surfaces. Disk clearance is measured in accordance with the method described by Guo et al., "Multidentate functionalized lubricant for ultralow head/disk spacing disk drive," *J. Applied Physics,* 100, 044306 (2006). Accordingly, the Clearance Index is the difference in thermal flying height control (TFC) clearance relative to the TFC clearance of a ZTMD lubricant described in U.S. Pat. No. 7,683,012 B2. In an embodiment, the Clearance Index of the lubricant is at least about 0.1 nm, such as at least about 0.2 nm, at least about 0.4 nm, or even at least about 0.8 nm.

In an example, the lubricant can be formed by linking end portions $R_a$ or $R_c$ using a middle portion. The end portions may be formed by adding terminal groups on to a perfluoropolyalkyl ether segment $R_b$. In a particular example, hydroxyl containing segments may be added on to the ends of the perfluoropolyalkyl ether segment, for example, as described in US Patent Application Publication No. 2007/0225183 µl. A middle portion formed of a branched perfluoropolyalkyl ether segment can be linked between two end portions. For example, the middle portion can be synthesized to include epoxide end groups and reacted with the end portions as described, for example, in U.S. Pat. No. 7,683,012 B2 or Guo et al. "Multidenate functionalized lubricant for ultralow head/disk spacing disk drive," *J. Applied Physics,* 100, 044306 (2006).

Following the synthesis reaction, the lubricant can be separated from other reaction byproducts through fractionation or other separation techniques. As a result, a lubricant having the average molecular weight described above can be obtained.

To facilitate bonding to a surface, the lubricant may be incorporated into a coating solution. For example, the coating solution can include a solvent and the surface agent, i.e. lubricant. The solvent can be a halogenated alkane or a halogenated cycloalkane. In embodiments, the solvent can be a fluorinated alkane or a fluorinated cycloalkane. An exemplary solvent includes a fluorinated solvent (2,3-dihydroperfluoropentane). The coating solution can include at least 0.001 g/l, such as 0.01 g/l of the surface agent, such as at least 0.05 g/l of the surface agent, at least 0.5 g/l of the surface agent, or even at least 1 g/l of the surface agent.

In another embodiment, the solvent can include a partially halogenated alkane or cycloalkane or a partially halogenated hydrohaloalkylether.

In an example, the surface agent can form a lubricating layer over a component of a storage device. Referring now to FIG. 1, a schematic diagram of an embodiment of a hard disk drive assembly 100 is shown. A hard disk drive assembly 100 generally comprises a housing or enclosure with one or more disks as described herein. The disk comprises magnetic recording media 11, rotated at high speeds by a spindle motor (not shown) during operation. The concentric data tracks 13 are formed on either or both disk surfaces magnetically to receive and store information.

Embodiments of a read or read/write head 110 may be moved across the disk surface by an actuator assembly 106, allowing the head 110 to read or write magnetic data to a particular track 13. The actuator assembly 106 may pivot on a pivot 114. The actuator assembly 106 may form part of a closed loop feedback system, known as servo control, which dynamically positions the read/write head 110 to compensate for thermal expansion of the magnetic recording media 11 as well as vibrations and other disturbances. Also involved in the servo control system is a complex computational algorithm executed by a microprocessor, digital signal processor, or analog signal processor 116 that receives data address information from an associated computer, converts it to a location on the magnetic recording media 11, and moves the read/write head 110 accordingly.

In some embodiments, read/write heads 110 periodically reference servo patterns recorded on the disk to ensure accurate head 110 positioning. Servo patterns may be used to ensure a read/write head 110 follows a particular track accurately, and to control and monitor transition of the head 110 from one track 13 to another. Upon referencing a servo pattern, the read/write head 110 obtains head position information that enables the control circuitry 116 to subsequently realign the head 110 to correct any detected error.

Servo patterns may be contained in engineered servo sectors 112 embedded within a plurality of data tracks 13 to allow frequent sampling of the servo patterns for improved disk drive performance, in some embodiments. In a typical magnetic recording media 11, embedded servo sectors 112 extend substantially radially from the center of the magnetic recording media 11, like spokes from the center of a wheel. Unlike spokes however, servo sectors 112 form a subtle, arc-shaped path calibrated to substantially match the range of motion of the read/write head 110.

In an embodiment, the storage device can be formed by dispensing a component having a magnetic surface and depositing a surface active agent on the magnetic surface. For example, depositing the surface active agent can include dip coating, spin coating, spray coating, a vapor deposition technique, or any combination thereof. In a particular example, the surface agent may form a layer having a thickness in a range of 1 Å to 20 Å, such as a thickness in a range of 6 Å to 12 Å.

In one embodiment, a storage device includes a magnetic media. The storage device can further include a lubricant disposed on the magnetic media. The lubricant can include the formula:

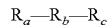

wherein $R_b$ includes

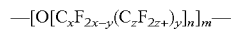

wherein x is an integer in the range between 1 and 8, y is an integer between 1 and 2x, z is an integer between 1 and 3, n is an integer between 1 and 6, and m is an integer between 1 and 50. At least one of $R_a$ and $R_c$ is selected from an anchor group, or a truncation group.

In another embodiment, the storage device includes an anchor group that is selected from the group consisting of:

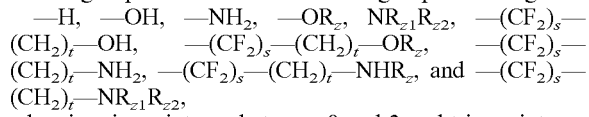

wherein s is an integer between 0 and 3 and t is an integer between 1 and 4, wherein $R_z$, $R_{z1}$, and $R_{z2}$ independently represent hydrogen, an aliphatic alkyl group, a perfluorinated alkyl group, or a group comprising the formula:

wherein i is an integer between 1 and 4, j is an integer between 0 and 2i, and k is an integer between 1 and 4.

In yet another embodiment, the storage device includes a truncation group that is selected from the group consisting of: —F, —$CF_3$, —$C_3F_7$, —$OR_v$, $NR_{v1}R_{v2}$, —$(CF_2)_s$—$(CH_2)_t$—$OR_v$, —$(CF_2)_s$—$(CH_2)_t$—$NHR_v$, and —$(CF_2)_s$—$(CH_2)_t$—$NR_{v1}R_{v2}$, wherein s is an integer between 0 and 3 and t is an integer between 1 and 4, wherein $R_v$, $R_{v1}$, and $R_{v2}$ independently represent hydrogen, an aliphatic alkyl group, or are selected from a group comprising the formula:

—$C_pF_{2p-q}(C_rF_{2r+1})_q$—F, wherein p is an integer between 1 and 4, q is an integer between 0 and 2p, and r is an integer between 1 and 4.

In one embodiment, the storage device includes a lubricant having the formula $R_a$—$CH_2$—$CF_2[O$—$[C_xF_{2x-y}(C_zF_{2z+1})_y]_n]_m$—$[O$—$CF_2]_u$—$O$—$CF_2CH_2$—$R_c$, wherein x is an integer between 1 and 8, y is an integer between 1 and 2x, s an integer between 1 and 3, n is an integer between 1 and 6, m is an integer between 1 and 20, u is an integer between 0 and 6, and $R_a$ or $R_b$ are independently selected from a truncation group or an anchor group.

In an embodiment, the storage device includes lubricant having the formula:

$CF_3$—$CH_2$—$CF_2$—$[O$—$[C_xF_{2x-y}(C_zF_{2z+1})_y]_n]_m$—$[O$—$CF_2]_u$—$O$—$CF_2CH_2$—OH or

HO—$CH_2$—$CF_2$—$[O$—$[C_xF_{2x-y}(C_zF_{2z+1})_y]_n]_m$—$[O$—$CF_2]_u$—$O$—$CF_2CH_2$—$CF_3$.

In another embodiment, the storage device includes a lubricant that has a molecular weight of at least about 1000 amu. In one embodiment, the storage device includes a lubricant that has a molecular weight of not greater than about 8000 amu.

In another embodiment, the storage device includes a lubricant which forms a layer having a thickness in a range of 1 Å to 20 Å. In an embodiment, the storage device includes a lubricant which exhibits a Clearance Index of at least 0.1 nm.

In one embodiment, the storage device has a group $R_b$ that includes

—$[O$—$CF_2$—$CF(CF_3)$—$CF_2$—$CF(CF_3)]_m$—, wherein m is an integer between 1 and 25.

In another embodiment, the storage device includes a lubricant that has the formula:

HO—$CH_2$—$CF(CF_3)$—$[O$—$CF_2$—$CF(CF_3)]$—$CF_2CF(CF_3)]_m$—F, wherein m is an integer between 1 and 25.

In one embodiment, the storage device includes a group $R_b$ having the formula:

—$[O$—$CF_2$—$CF(CF_3)$—$]_m$—, wherein m is an integer between 1 and 50.

In another embodiment, the storage device includes a lubricant that has the formula:

HO—$CH_2$—$CF(CF_3)$—$[O$—$CF_2$—$CF(CF_3)]_m$—F, wherein m is an integer between 1 and 50.

In another embodiment, a coating solution includes a solvent. The coating solution can include a surface agent having the formula $R_a$—$R_b$—$R_c$, wherein $R_b$ includes —$[O[C_xF_{2x-y}(C_zF_{2z+1})_y]_n]_m$— wherein x is an integer in the range between 1 and 8, y is an integer between 1 and 2x, z is an integer between 1 and 3, n is an integer between 1 and 6, and m is an integer between 1 and 50. At least one of $R_a$ and $R_c$ is selected from an anchor group, or a truncation group.

In one embodiment, the coating solution includes an anchor group which is selected from the group consisting of: —H, —OH, —$NH_2$, —$OR_z$, $NR_{z1}R_{z2}$, —$(CF_2)_s$—$(CH_2)_t$—OH, —$(CF_2)_s$—$(CH_2)_t$—$OR_z$, —$(CF_2)_s$—$(CH_2)_t$—$NH_2$, —$(CF_2)_s$—$(CH_2)_t$—$NHR_z$, and —$(CF_2)_s$—$(CH_2)_t$—$NR_{z1}R_{z2}$, wherein s is in the range between 0 and 3 and t is in the range between 1 and 4, wherein $R_z$, $R_{z1}$, and $R_{z2}$ independently represent hydrogen, an aliphatic alkyl group, a perfluorinated alkyl group, or a group comprising the formula:

—$C_iH_{2i-j}(C_kH_{2k})_j$—OH, wherein i is in the range from 1 to 4, j is in the range from 0 to 2, and k is in the range from 1 to 3.

In another embodiment, the coating solution includes a truncation group is selected from the group consisting of: —$CF_3$, —$OR_v$, $NR_{v1}R_{v2}$, —$(CF_2)_s$—$(CH_2)_t$—$OR_v$, —$(CF_2)_t$—$(CH_2)_t$—$NHR_v$, and —$(CF_2)_s$—$(CH_2)_t$—$NR_{v1}R_{v2}$, wherein s is in the range between 0 and 3 and t is in the range between 1 and 4, wherein $R_v$, $R_{v1}$, and $R_{v2}$ independently represent hydrogen, an aliphatic alkyl group, or are selected from a group comprising the formula:

—$C_pF_{2p-q}(C_rF_{2r})_q$—F, wherein p is an integer between 1 and 4, q is an integer between 0 and 2p, and r is in the range from 1 to 3.

In yet another embodiment, the coating solution includes a surface agent which is selected from the group comprising the formula $R_a$—$CH_2$—$CF_2[O$—$[C_xF_{2x-y}(C_zF_{2z+1})_y]_n]_m$—$[O$—$CF_2]_u$—$O$—$CF_2CH_2$—$R_c$, wherein x is an integer between 1 and 8, y is an integer between 1 and 2x, s an integer between 1 and 3, n is an integer between 1 and 6, m is an integer between 1 and 20, u is an integer between 0 and 6, and $R_a$ or $R_b$ are independently selected from a truncation group or an anchor group.

In one embodiment, the coating solution includes a surface agent which is selected from:

$CF_3$—$CH_2$—$CF_2$—$[O$—$[C_xF_{2x-y}(C_zF_{2z+1})_y]_n]_m$—$[O$—$CF_2]_u$—$O$—$CF_2CH_2$—OH or

HO—$CH_2$—$CF_2$—$[O$—$[C_xF_{2x-y}(C_zF_{2z+1})_y]_n]_m$—$[O$—$CF_2]_u$—$O$—$CF_2CH_2$—$CF_3$.

In another embodiment, the coating solution has a concentration of the surface agent of at least 0.001 g/l. The coating solution can include a solvent which has a halogenated alkane or a halogenated cycloalkane, or a partially halogenated alkane or cycloalkane or a halogenated or partially halogenated hydrohaloalkylether. In one particular embodiment, the solvent is 2,3-dihydroperfluoro-pentane.

In one embodiment, a method of manufacturing a storage device includes: dispensing a magnetic media; and depositing at least one lubricant selected from the group comprising the formula:

$R_a$—$R_b$—$R_c$, wherein $R_b$ includes

—$[O[C_xF_{2x-y}(C_zF_{2z+1})_y]_n]_m$— wherein x is an integer in the range between 1 and 8, y is an integer between 1 and 2x, z is an integer between 1 and 3, n is an integer between 1 and 6, and m is an integer between 1 and 50. At least one of $R_a$ and $R_c$ is selected from an anchor group, or a truncation group.

In another embodiment, the depositing includes dip coating, spin coating, spray coating, or vapor deposition.

In another embodiment, the method includes a surface active agent which is selected from the group comprising the formula:

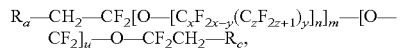

wherein x is an integer between 1 and 8, y is an integer between 1 and 2x, s an integer between 1 and 3, n is an integer between 1 and 6, m is an integer between 1 and 20, u is an integer between 0 and 6, and $R_a$ or $R_b$ are independently selected from a truncation group or an anchor group.

In yet another embodiment, the method includes a surface active agent which is selected from

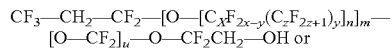

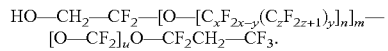

EXAMPLES

A surface agent having an approximate structure of formula $R_a$—$R_b$—$R_c$ above is prepared and tested relative to lubricants that have no perfluorinated side chains.

As illustrated in Table 1, the Clearance Index of PTMG diepoxide is approximately 1.5 nm higher than ZTMD coated surface.

TABLE 1

Comparative Performance of regular unbranched polyether lubricants and polyether lubricants having branched perfluorinated side chains.

|  | unbranched | Branched |
|---|---|---|
| Clearance Index (nm) | 9.25 | 10.00 |

Figure 2:
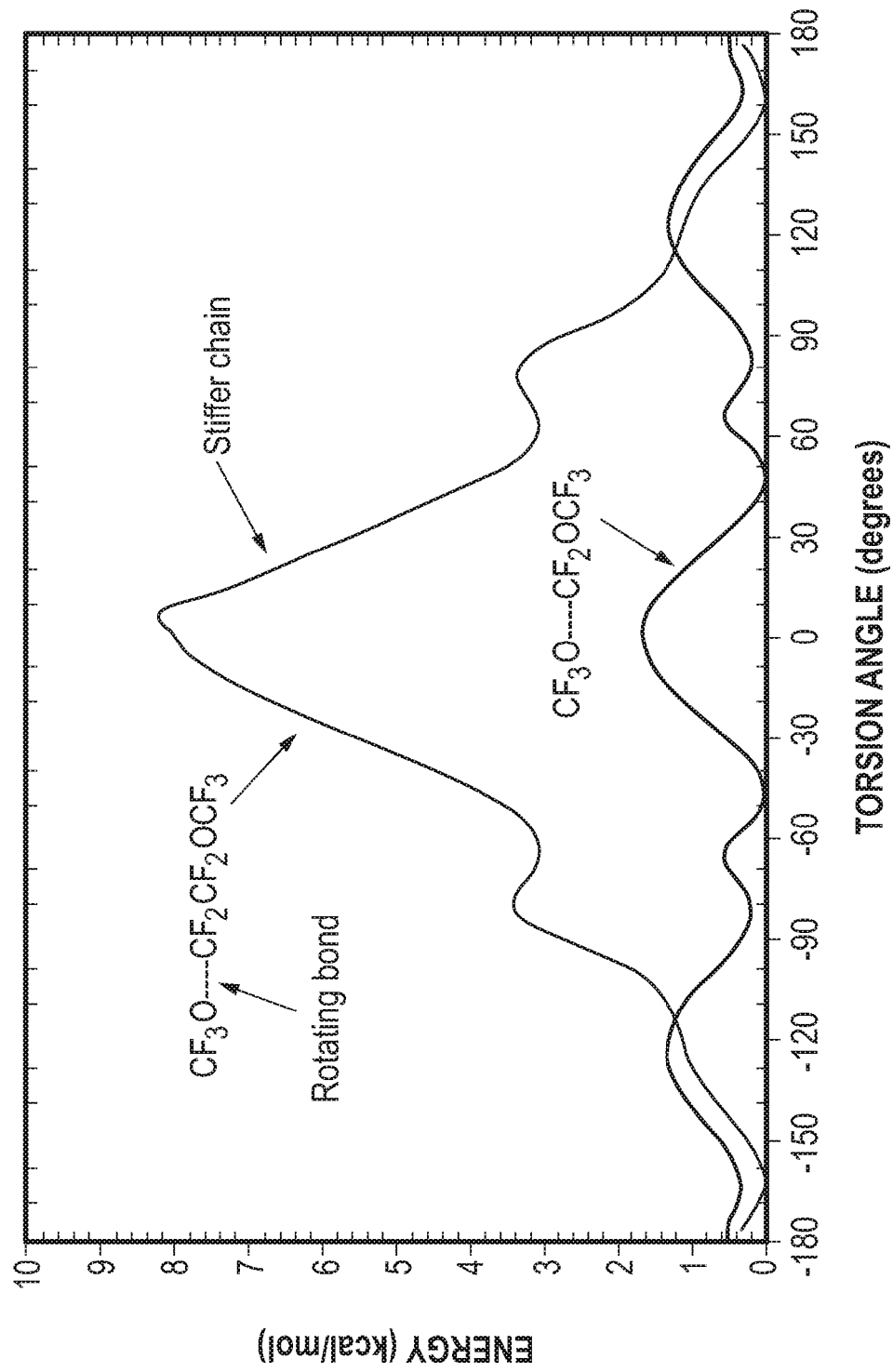
FIG. 2 includes torsional energy diagrams of the C—O bond from selected perfluorinated ether units.

FIG. 2 depicts the torsional angle energy diagram for perfluorinated ethylene polyether and perfluorinated methylene polyethers. The rotation to which the torsion angle energy diagrams relate is around the O—C bond of each polyether. The difference between the two molecules is that one polyether has a O—C—O—C—O—C-backbone while the second has a O—C—C—O—C—C—O backbone. As can be seen in FIG. 2, when the numbers of carbons are increased between two ether oxygens, the energy necessary for a staggered conformation (Torsion angle 0°) rises at least five fold. Likewise any other torsional angle from −90° to +90° requires more energy for the polyether having a higher carbon oxygen ratio. In conclusion, the polyether having a higher carbon oxygen ratio is the stiffer molecule.

It follows that adding even more carbon atoms to the backbone such as perfluorinated side chains and thereby increasing the carbon oxygen ratio even further would result in the torsional angle energy diagram of an even stiffer polyether. Stiffer polyether molecules permit better control of the surface energy once the polyether is applied onto a media surface.

Figure 3:
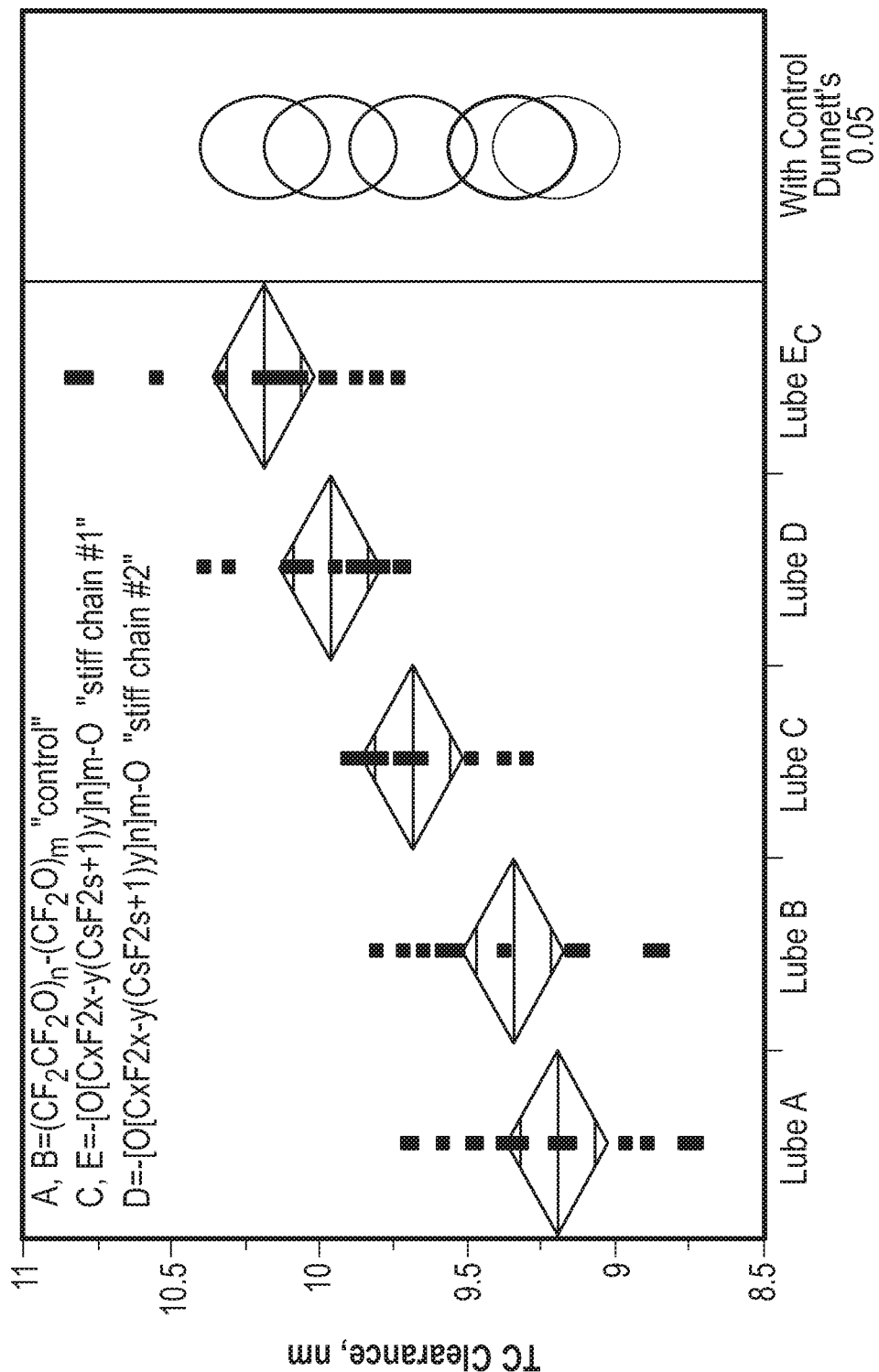
FIG. 3 includes a plot of touch-down (TD) clearance for various lubricating media.

FIG. 3 depicts the touchdown (TD) clearance of a slider above a magnetic surface wherein the magnetic surface carries a lubricant. Lubes A and B are lubricants without side chains, while Lubes C, D, and E represent lubricants with stiffer backbones due to the presence of side chains. FIG. 3 shows that lubes with side chains have an average higher touchdown clearance than lubes without. Lube A is derived of the $(CF_2CF_2O)_n$—$(CF_2O)_m$ main chain with n and m both equal to about 10. Lube B is derived of the $(CF_2CF_2O)_n$—$(CF_2O)_m$ main chain with n and m both equal to about 6. Lubes C, E are derived of the —[O[$C_xF_{2x-y}$($C_sF_{2s+1}$)$_y$]$_n$]$_m$—O main chain with x=2, y=0, n=1, s=0, and m=24 and 30, respectively. Lube D is derived of the —[O[$C_xF_{2x-y}$($C_sF_{2s+1}$)$_y$]$_n$]$_m$—O main chain with x=3, y=0, n=1, s=0, and m=10.

Figure 4:
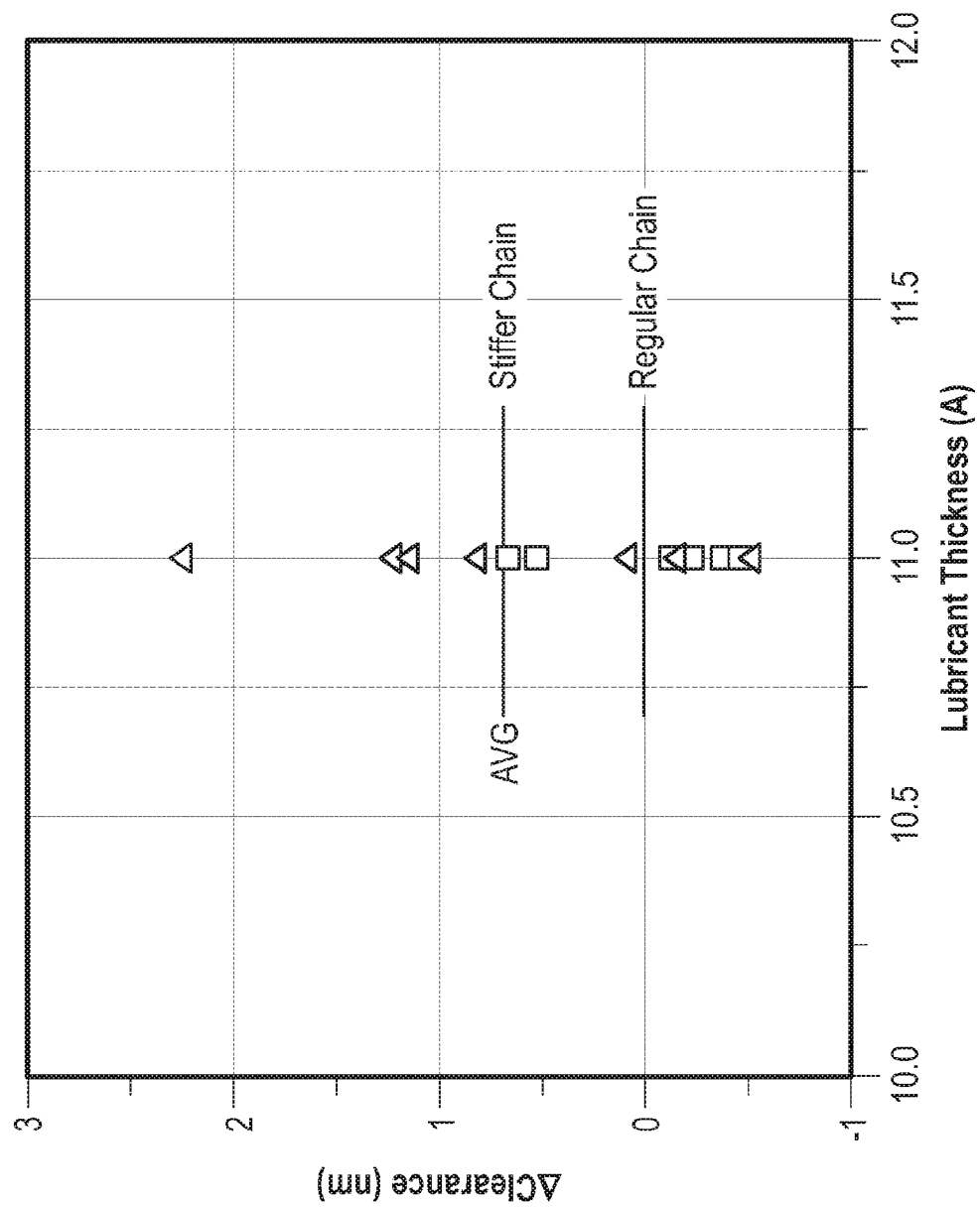
FIG. 4 depicts a comparison of clearance change for lubricating media having branched backbones.

FIG. 4 summarizes the increase of clearance for stiffer chains, i.e. polyethers that contain side chains versus regular polyethers having no side chains. The lubricants were applied on the magnetic surface at a thickness of 11.0 Å.

Figure 5:
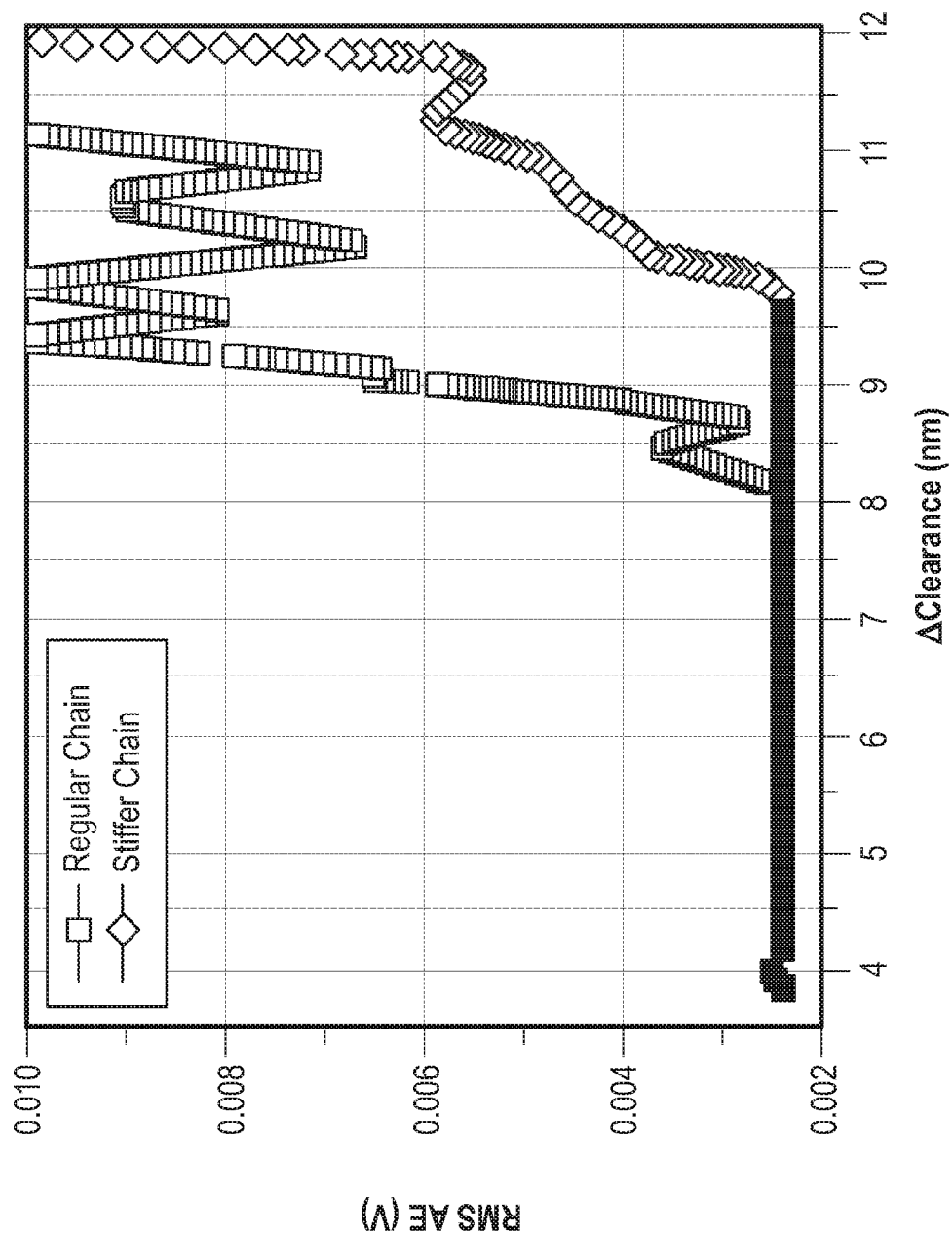
FIG. 5 depicts a comparison of acoustic emission (AE) vs. clearance for lubricants having a regular chain and a stiffer chain The use of the same reference symbols in different drawings indicates similar or identical items.

FIG. 5 depicts the onset of slider-disk interaction by acoustic emission (AE) detection as a function of slider-disk clearance. The lubricants were applied on the magnetic surface at the identical thickness of 11 Angstrom and same molecular weight of about 2200. The regular chain is comprised of the $(CF_2CF_2O)_n$—$(CF_2O)_m$ backbone while the stiffer chain is derived of a —[O[$C_xF_{2x-y}$($C_sF_{2s+1}$)$_y$]$_n$]$_m$—O backbone in the perfluoropolyether.

As such, embodiments of the surface agent described above advantageously exhibits desirable properties. For example, the surface agent can have a desirable Durability Index and Bonded Ratio.

Durability Index is the time until a failure of a head observed during a touchdown stress test. The touchdown stress test is performed by flying a head over the surface of a coated disk. The coated disk includes a coating of one of a surface agent as described herein or a reference compound, e.g. ZTMD, (both at the same thickness, e.g., 12 Å). During the test, the head is caused to touchdown at a rate of one touchdown per second through TFC. The length of time until head failure is recorded as the Durability Index. The Durability Index of a surface agent described herein can be compared to the Durability Index of the reference compound. The Bonded Ratio is the stabilized fraction of bonded molecules remaining after exposure to a solvent. For example, the Bond Ratio may be at least 80%, such as at least 85%. Furthermore, the surface agent can have a desirable Clearance Index This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

We claim:

1. A storage device comprising:
a magnetic media; and
a lubricant disposed on the magnetic media, the lubricant selected from the group comprising the formula:

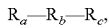

wherein $R_b$ includes

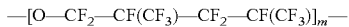

wherein m is an integer between 1 and 50; and
wherein at least one of $R_a$ and $R_c$ is selected from an anchor group, or a truncation group, wherein the anchor group is selected from the group consisting of:
—H, —OH, —NH$_2$, —OR$_z$, NR$_{z1}$R$_{z2}$, —(CF$_2$)$_s$—(CH$_2$)$_t$—OH, —(CF$_2$)$_s$—(CH$_2$)$_t$—OR$_z$, —(CF$_2$)$_s$—(CH$_2$)$_t$—NH$_2$, —(CF$_2$)$_s$—(CH$_2$)$_t$—NHR$_z$, and —(CF$_2$)$_s$—(CH$_2$)$_t$—NR$_{z1}$R$_{z2}$,
wherein s is an integer between 0 and 3 and t is an integer between 1 and 4,
wherein $R_z$, $R_{z1}$, and $R_{z2}$ independently represent hydrogen, an aliphatic alkyl group, a perfluorinated alkyl group, or a group comprising the formula:

wherein i is an integer between 1 and 4, j is an integer between 0 and 21, and k is an integer between 1 and 4.

2. The storage device according to claim 1, wherein the truncation group is selected from the group consisting of:
—F, —CF$_3$, —C$_2$F$_5$, —C$_3$F$_7$, —OR$_v$, NR$_{v1}$R$_{v2}$, —(CF$_2$)$_s$—(CH$_2$)$_t$—OR$_v$, —(CF$_2$)$_s$—(CH$_2$)$_t$—NHR$_v$, and —(CF$_2$)$_s$—(CH$_2$)$_t$—NR$_{v1}$R$_{v2}$,
wherein s is an integer between 0 and 3 and t is an integer between 1 and 4,
wherein $R_v$, $R_{v1}$, and $R_{v2}$ independently represent hydrogen, an aliphatic alkyl group, or are selected from a group comprising the formula:

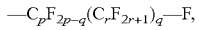

wherein p is an integer between 1 and 4, q is an integer between 0 and 2p, and r is an integer between 1 and 4.

3. The storage device according to claim 1, wherein the lubricant has a molecular weight of at least about 1000 amu.

4. The storage device according to claim 1, wherein the lubricant has a molecular weight of not greater than about 8000 amu.

5. The storage device of claim 1, wherein the lubricant forms a layer having a thickness in a range of 1 Å to 20 Å.

6. The storage device of claim 1, wherein the lubricant exhibits a Clearance Index of at least 0.1 nm.

7. The storage device of claim according to claim 1, wherein the lubricant includes

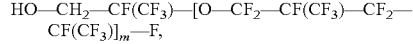

wherein m is an integer between 1 and 25.

8. A coating solution comprising:
a solvent; and
a surface agent selected from the group comprising the formula:

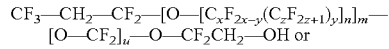

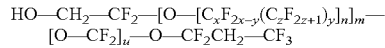

wherein x is an integer between 1 and 8, y is an integer between 1 and 2x, z an integer between 1 and 3, n is an integer between 1 and 6, m is an integer between 1 and 20, u is an integer between 0 and 6.

9. The coating solution of claim 8 having a concentration of the surface agent of at least 0.001 g/l.

10. The coating solution of claim 8, wherein the solvent comprises a halogenated alkane or a halogenated cycloalkane, or a partially halogenated alkane or cycloalkane or a halogenated or partially halogenated hydrohaloalkylether.

11. The coating solution of claim 9, wherein the solvent is 2,3-dihydroperfluoro-pentane.

12. A method of manufacturing a storage device, the method comprising:
dispensing a magnetic media; and
depositing onto the magnetic media at least one lubricant selected from the group comprising the formula:

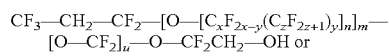

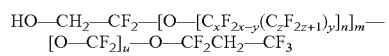

wherein x is an integer between 1 and 8, y is an integer between 1 and 2x, z an integer between 1 and 3, n is an integer between 1 and 6, m is an integer between 1 and 20, u is an integer between 0 and 6.

13. The method of claim 11, wherein depositing includes dip coating, spin coating, spray coating, or vapor deposition.

14. A storage device comprising:
a magnetic media; and
a lubricant disposed on the magnetic media, the lubricant selected from the group comprising the formula:

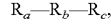

wherein $R_b$ includes

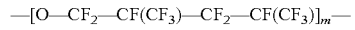

wherein m is an integer between 1 and 50; and
wherein at least one of $R_a$ and $R_c$ is selected from an anchor group, or a truncation group, wherein the anchor group is selected from the group consisting of:
—H, —OH, —NH$_2$, —OR$_z$, NR$_{z1}$R$_{z2}$, —(CF$_2$)$_s$—(CH$_2$)$_t$—OH, —(CF$_2$)$_s$—(CH$_2$)$_t$—OR$_z$, —(CF$_2$)$_s$—

$-(CH_2)_t-NH_2$, $-(CF_2)_s-(CH_2)_t-NHR_z$, and $-(CF_2)_s-(CH_2)_t-NR_{z1}R_{z2}$, wherein s is an integer between 0 and 3 and t is an integer between 1 and 4, wherein $R_z$, $R_{z1}$, and $R_{z2}$ independently represent hydrogen, an aliphatic alkyl group, a perfluorinated alkyl group, or a group comprising the formula:

$-C_iH_{2i-j}(C_kH_{2k+1})_j-OH$, wherein i is an integer between 1 and 4, j is an integer between 0 and 2i, and k is an integer between 1 and 4.

15. The storage device of claim according to claim 14, wherein the lubricant includes $HO-CH_2-CF(CF_3)-[O-CF_2-CF(CF_3)-CF_2-CF(CF_3)]_m-F$, wherein m is an integer between 1 and 25.

\* \* \* \* \*

UNITED STATES PATENT AND TRADEMARK OFFICE
CERTIFICATE OF CORRECTION

| | | |
|---|---|---|
| PATENT NO. | : 9,045,711 B2 | Page 1 of 1 |
| APPLICATION NO. | : 13/328869 | |
| DATED | : June 2, 2015 | |
| INVENTOR(S) | : Hong Deng et al. | |

It is certified that error appears in the above-identified patent and that said Letters Patent is hereby corrected as shown below:

In The Claims
Column 11, claim 1, please delete "wherein i is an integer between 1 and 4, j is an integer between 0 and 21," and insert --wherein i is an integer between 1 and 4, j is an integer between 0 and 2i,--

Signed and Sealed this
Eighth Day of March, 2016

Michelle K. Lee
*Director of the United States Patent and Trademark Office*